United States Patent [19]

Matsui

[11] 3,803,721
[45] Apr. 16, 1974

[54] GRADUATOR FOR SURVEYING PURPOSES

[76] Inventor: Atsushi Matsui, 12 Baban-cho, Shizuoka, Japan

[22] Filed: Aug. 21, 1970

[21] Appl. No.: 65,991

[52] U.S. Cl............................ 33/283, 33/351, 33/391
[51] Int. Cl............................. G01c 1/00, G01c 9/12
[58] Field of Search....... 33/64 B, 70 B, 70 E, 70 F, 33/218, 219, 214

[56] References Cited
UNITED STATES PATENTS

| 2,632,958 | 3/1953 | Masters | 33/368 |
| 3,336,679 | 8/1967 | Davis | 33/368 |
| 102,882 | 5/1870 | Towle | 33/282 |
| 1,409,833 | 3/1922 | Cook | 33/218 |
| 377,658 | 2/1888 | Wentworth et al. | 33/215.1 |
| 140,055 | 6/1873 | Marston | 33/214 |
| 2,746,164 | 5/1956 | Eitzen | 33/214 |
| 899,730 | 9/1908 | Haunty | 33/218 |
| 1,393,314 | 10/1921 | Potter | 33/219 |

FOREIGN PATENTS OR APPLICATIONS

| 468,993 | 2/1952 | Italy | 33/70 B |

*Primary Examiner*—Louis R. Prince
*Assistant Examiner*—Charles E. Phillips

[57] ABSTRACT

A surveying graduator comprising a box-shaped body of transparent material and having a decimal reference scale thereon in basic length of 100 mm and a rotable index pivotally mounted in the interior of the body. The body includes angle and gradient graduations cooperatively arranged with respect to the index and a sliding rule displaceably mounted in a lateral side of the body for movement in a direction perpendicular to the reference scale.

10 Claims, 12 Drawing Figures

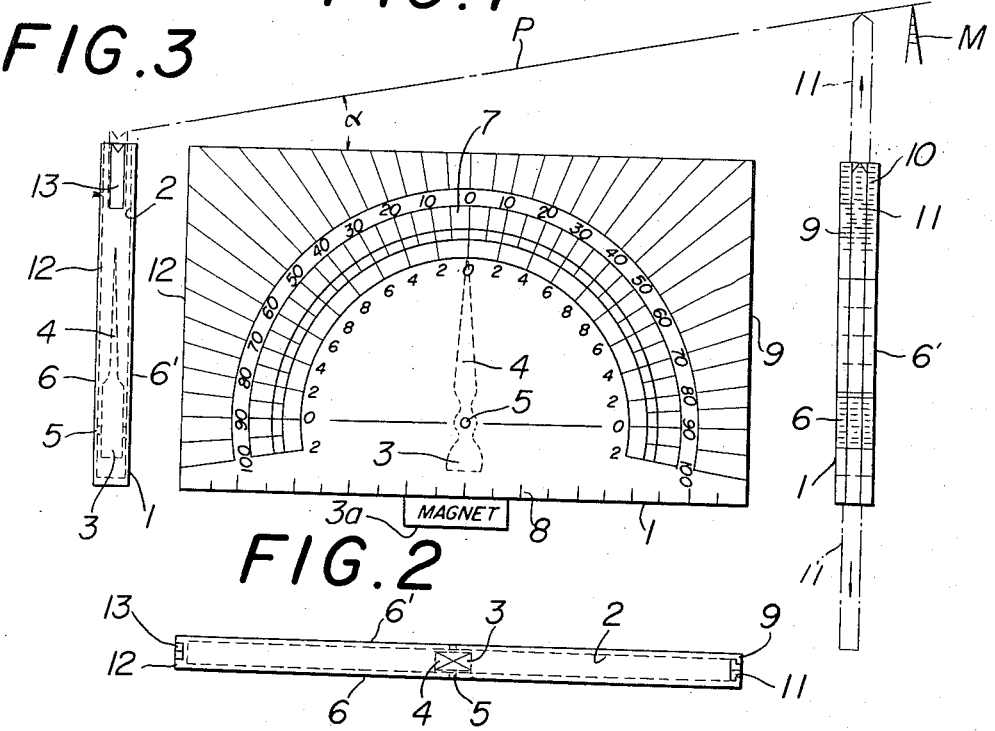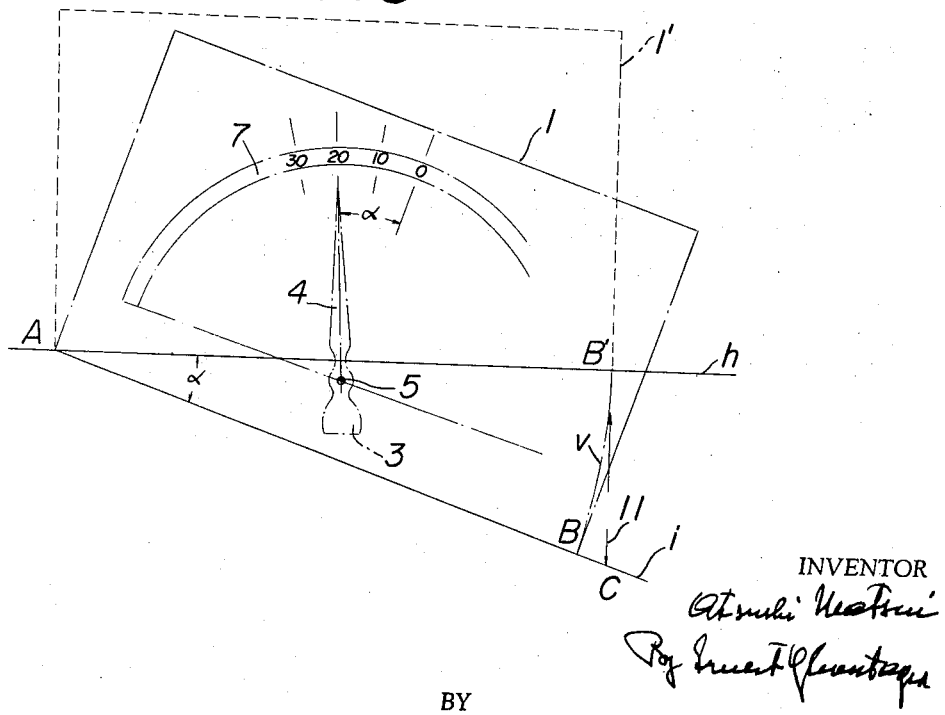

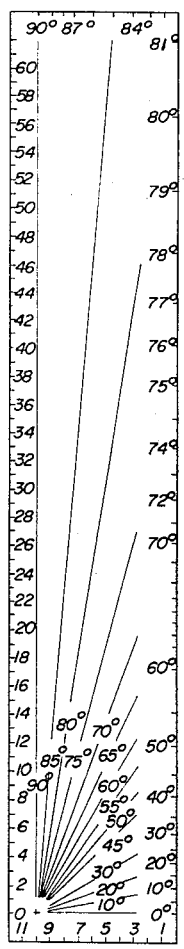
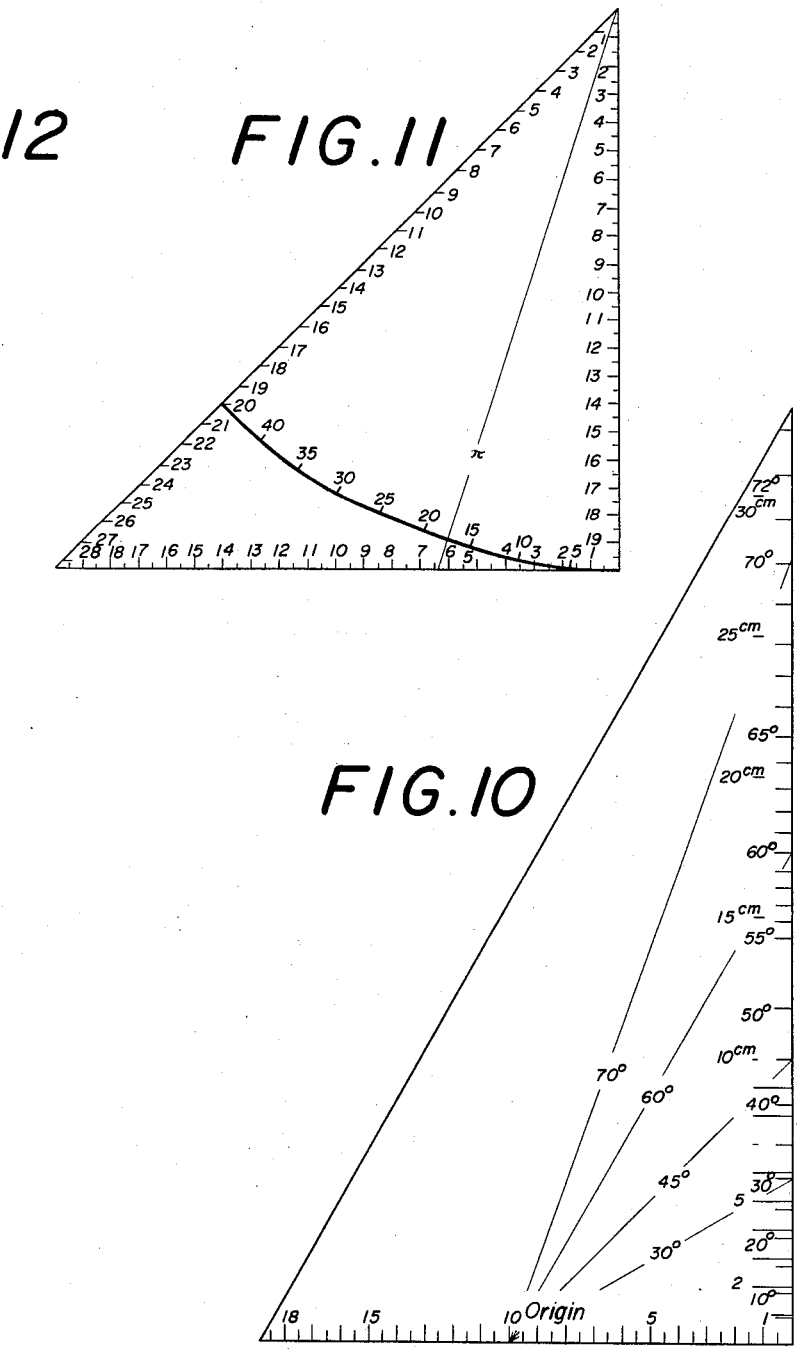
FIG. 12  FIG. 11  FIG. 10

GRADUATOR FOR SURVEYING PURPOSES

The present invention relates to a graduator for surveying purposes.

Surveying instruments are known which provide the measurement of an angle with an accuracy of the order of about 20 seconds, and it has been of extreme difficulty to achieve higher accuracy with the angle division system of the known graduator.

The present invention, therefore, has for its object the provision of an improvement in surveying instruments which comprises the conception, that an angle is determined by the use of a base having a length of 100 mm. and sliding rule that is movable in a direction at right angles to the base. This permits an extremely small angle to be determined, as exemplified by an incremental angle of about 0.8 second corresponding to 0.01 mm. on the sliding rule in the region of 500 mm. length or an incremental angle of 0.9 second corresponding to 0.1 mm. on the sliding rule in the region of 1500 mm. length.

Where the above conception is reduced to practice in a three-dimension manner, the present invention provides a surveying graduator, which comprises a box-shaped body of transparent material, the body having its top or bottom side provided with a reference scale in the decimal system, a rotatable index pivoted in the interior of the body, graduations on one or both of the opposite sides of the body for cooperation with the index to indicate an angle or gradient, and a slidable rule removably mounted on one of the lateral sides of the body.

The present invention also provides a surveying graduator in the form of a triangle or bar rule, which is provided with a reference scale in the decimal system.

With these and other objects in view, which will become apparent in the following detailed description the present invention will be clearly understood in connection with the accompanying drawings, in which:

FIG. 1 is a front elevation of a first embodiment of the present invention:

FIG. 2 is a top plan view of the first embodiment;

FIG. 3 is a side elevation as viewed from the left-hand side in FIG. 1;

FIG. 4 is a similar elevation as viewed from the right-hand side in FIG. 1;

FIGS. 5 and 6 are schematic views illustrating the first embodiment in use;

FIG. 10 is a front view of a scalene, right-angled triangle in which the construction of above embodiments is applied in a two-dimensional manner;

FIG. 11 is a front view of an equilateral, right-angled triangle; and

FIG. 12 shows another embodiment of the present invention as applied to a bar rule.

Figure 6:
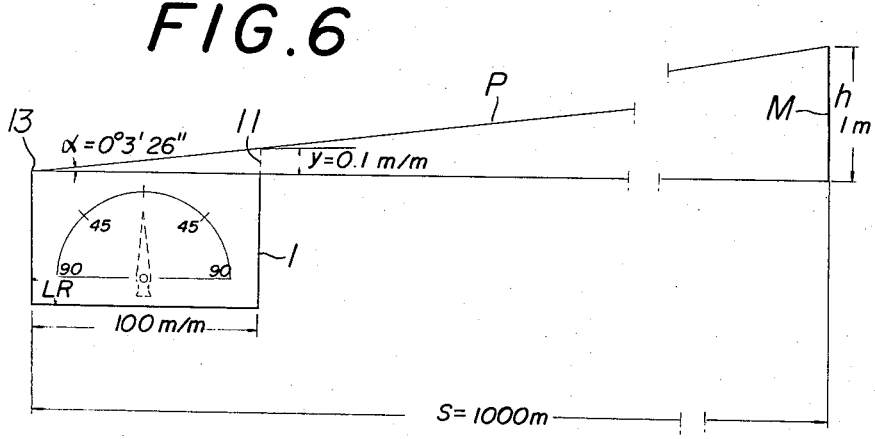

Referring now to the drawings, and initially to FIGS. 1 to 6 inclusively, the first embodiment shown comprises a rectangular body 1 of transparent material having a hollow inner space 2.

Centrally within the bottom space is pivotally mounted an index 4 by a pivot 5, the index 4 having a weight 3 secured thereto to normally maintain the index vertically upright. On the front plate 6 or rear plate 6' are formed angular and gradient graduations 7 in the form of arcs struck from the pivot 5, the graduations covering a range of angle in excess of 180°, for example 200°. The lower edge of the front plate 6 is provided with a scale 8. One of the lateral sides 9 of the body 1 is provided with a scale 10 and has mounted centrally therein a sliding rule 11 in a removable manner. Loosely fitted in the top of the other lateral side 12 is a sighting mark 13. The body 1 may be provided with an encased magnet 3a, which is releasably mounted centrally at the bottom for holding the weight 3 of the index 4 by the magnetic attraction and preventing angular movement thereof, when carrying about the graduator.

In use, the graduator according to this embodiment may be placed on an inclined surface i having an angle of inclination, as shown in FIG. 5, whereby by gravity of the weight 3, the index 4 rotates to the left to indicate the angle $\alpha$. Because of similitude with respect to the horizontal $h$, the angle $\alpha$ represents the angle of inclination of the inclined surface i. Then the sliding rule 11 is extended, until the graduator is raised in the direction v into the position 1' where the index 4 points toward the zero degree. The then extended length of the sliding rule which brought the graduator to the horizontal, will be given by $$\tan x' \ B'c/a B' = 35/100 = .35;$$

where I have assumed that the segment B'C had a length of 3.5 cm. thus the tan $x$ is read directly by the extended length of slide 11. The reference base AB' has a length of 100mm.. While the heretofore known structures involve calculation difficulties using tangent tables, the present invention does not need numerical tables for tangent because of the relationship $\tan \alpha = b/a$, and whereas the prior art structures further could not provide an angle mensuration without a surveying instrument, the present invention enables an approximate estimate to be obtained in a simple manner as mentioned above.

Alternative use of the graduator is possible by pulling the rule 11 and sight mark 13 upwardly, as shown in joint-dotted lines in FIGS. 3 and 4, to establish a line of sight P from the sighting mark 13 to a target to be measured, and then by bringing the rule to reach the line of sight P, the height and the angle can be readily determined. From the estimate of the multiplication factor, the distance to the target can also be determined easily.

By disposing the body 1 in a horizontal position, as shown in FIG. 6 and pulling the rule 11 upwardly by a distance of Y an object to be measured M can be caught on a line of sight P from the sighting mark 13, passing through the top of the rule 11. Assumng that the object had a length of 1 meter, the following proportional expression is obtained:

$$0.1 : 1000 = 100 : x$$

$$x = 1000 \times 100/0.1$$

or $x = 1000$ m Thus the object M is calculated to be at a distance $s$ which is 1000 meters from the body 1.

because the body 1 has a fixed bottom side, various surveying calculations can be made as by using the body 1 directly to determine $\sin\alpha$ and $\cos\alpha$ or by raising or lowering the rule 11 to determine $\tan\alpha$.

Figure 7:
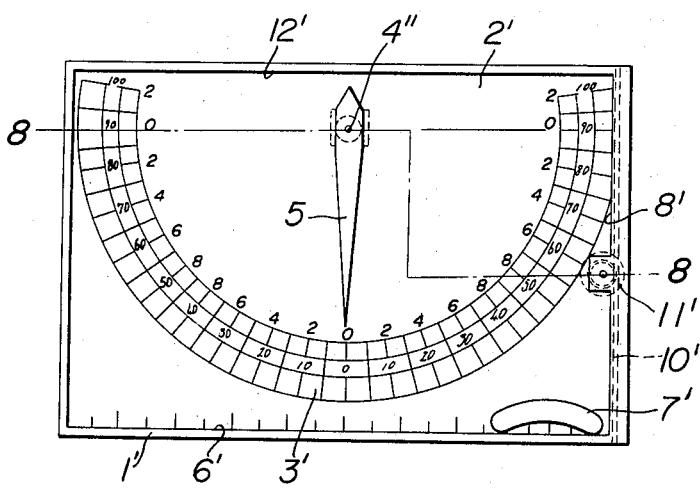
FIG. 7 is a front elevation of a second embodiment of the present invention.
Figure 9:
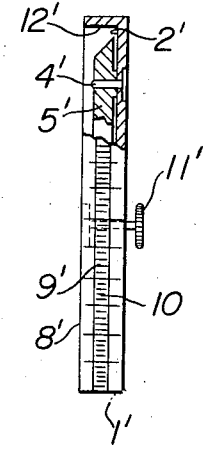
FIG. 9 is a side elevation, partly broken away, to show a section, of the second embodiment as viewed from the right-hand side in FIG. 7.
Figure 8:
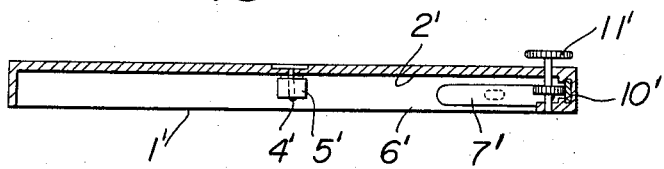
FIG. 8 is a section along the lines 8—8 of FIG. 7.

Referring now again to the drawings, and in particular to FIGS. 7 to 9, which show a second embodiment of the present invention it comprises a box-shaped body 1' of transparent material which is open at the front. The rear plate of the body 1' has angular and gradient graduations 3' recorded on its inner surface, and to the top center of the rear plate 2' which corresponds to the center of arcuate graduations 3' is secured a pivot 4' which pivotally carries an index 5' in a removal manner, the index 5' depending vertically by gravity. On the bottom 6' of the body 1' is disposed a stationary level 7', and in one of the side plates 8' is releasably mounted a sliding rule 10' having centimeter graduations 9'. The rule 10 is adapted to be raised or lowered by operation of a knob 11' in the manner of rack and pinion mechanism. Reference numeral 12' indicates a top plate which is of course provided with a 10 centimeter scale on its back for the convenience of estimating a multiplication factor.

With this embodiment, the body 1' may be placed on an object to be measured or the top plate 12' held against the object to provide a direct reading of the position of the index 5' on the graduations 3' as well as the level 7'. An error needed to provide proper correction can readily be estimated by a reading of the centimeter graduations on the rule 10' upon inclining the body 1' either upwardly or downwardly by operating the knob 11' provided on the lateral side to raise or lower the rule 10'.

The body 1' may be used to ascertain the vertical by applying its lateral side against a column, post or the like. When out of use, the index 5' may be removed from the pivot 4' for the convenience of carrying about the graduation, so that the graduator may be carried from place to place to simply provide a correct surveying for most surveying purposes. As will be noted, while the first embodiment has a fixed index to cooperate with upper located, semicirculator graduations, the present embodiment is distinguished therefrom in that the index is mounted on the pivot each time it is used to depend vertically for cooperating with lower located graduations and is removed from the pivot when it is not used to prevent the damages to the index.

Two-dimensional applications of the principle exemplified by the two embodiments of the present invention, shown in FIGS. 1 and 7, are shown by embodiments disclosed in FIGS. 10 to 12. The embodiment shown in FIG. 10 is a scalene, right-angled triangle having a base of 100 mm. long and another side forming right angles with the base which is substituted for a sliding rule, the latter side having thereon centimeter graduations and angular graduations derived from the centimeter graduations. Because of the limited length of the sliding rule used heretofore, the angle indication is given up to a value slightly greater than 72.

FIG. 11 shows a right-angled triangle which has a reference side of 200 mm. in length and in which an arc having a radius of 200 mm. is struck from one end of the reference side to provide a better indication for angles less than 45°, which the triangle of FIG. 10 could not indicate with sufficient resolution. A section paper is applied to the triangle to facilitate readings, whereby triangular functions, i. e., sine, cosine and tangent are determined with a satisfactory accuracy. The graduations in the section paper also permit diagonals or circumferences of objects to be determined.

FIG. 12 shows a bar rule, which does not have a length limitation and in which graduations are given down to minutes. The rule covers angles which cannot be indicated by the rule of FIG. 10. It will be noted that with an increased reading on the centimeter graduations, one degree of the angle encompasses an increasing length. For example, an angle of 82°0' corresponds to 711.5 mm. while 82°59' corresponds to 814.3 mm., and thus 1° in such region encompasses 102.8 mm.. The rule is reduced in size for portability and convenience purposes.

While various length units are employed in different countries to devote gradients, such as meter, yard and the like, it will be most convenient to use the decimal meter system for indicating a gradient.

From the foregoing, it will be appreciated that the graduator according to the present invention can be carried about everywhere to provide a correct mensuration for any surveying purposes, including the measurement of the horizontal, vertical or any other intermediate inclination in architecture or other structures. Such convenience is not to be compared with the known level, plumb rule and the like. The graduator can be effectively used by architecture and civil engineering experts as well as for teaching material in primary and middle schools.

While I have disclosed several embodiments of the present invention, it is to be understood that these embodiments are given by example only, and not in a limiting sense.

I claim:

1. A graduator for surveying and other purposes comprising
    a box-shaped body of transparent material and having a base length of 100 units, a decimal reference scale thereon along an edge corresponding to said base length;
    said body having a rectangular hollow space interior,
    a rotatable index pivotly mounted in the interior of said body,
    said body including angle and gradient graduations cooperatively arranged with respect to the pivot point of said index, and covering a range in excess of 180°, and
    a sliding rule displaceably mounted in a lateral side of said body adjacent one end of said base length for movement in a direction perpendicular to said reference scale, said lateral side and said sliding rule having a scale of said units with similar graduations.

2. The graduator, as set forth in claim 1, wherein said reference scale is disposed adjacent the top of said body.

3. The graduator, as set forth in claim 1, wherein said reference scale is disposed adjacent the bottom of said body.

4. The graduator, as set forth in claim 1, wherein said angle of gradient graduations are disposed on opposite surfaces of said body.

5. The graduator, as set forth in claim 1, wherein said index comprises a pointer.

6. The graduator, as set forth in claim 5, wherein
said pointer points upwardly, and
a weight on the bottom of said pointer maintaining said pointer always in a vertical postion.

7. The graduator, as set forth in claim 6, further comprising
a magnet means releasably encased at the bottom adjacent the weight for attracting said weight and holding said index stationary when said graduator is not in use.

8. The graduator, as set forth in claim 1, wherein said index comprises a pointer pointing vertically downwardly, and a stationary level mounted in said body.

9. The graduator, as set forth in claim 1, wherein
said pointer is pivotally mounted in the interior of said body in an operative condition, and for being placed into an inoperative position.

10. The graduator, as set forth in claim 1, further comprising a sighting mark disposed at the top of the other lateral side of said body for operative sighting of the free extended end of said sliding rule.

* * * * *